E. KUHNS.
GRAIN-DRILL.

No. 186,090.  Patented Jan. 9, 1877.

Attest
C. M. Connell
E. H. Bulley

Inventor
Edward Kuhns
Per Blanchard & Singleton
Attorneys

UNITED STATES PATENT OFFICE.

EDWARD KUHNS, OF LOGANSPORT, INDIANA, ASSIGNOR OF ONE-HALF HIS RIGHT TO BENJAMIN KUHNS, OF DAYTON, OHIO.

IMPROVEMENT IN GRAIN-DRILLS.

Specification forming part of Letters Patent No. 186,090, dated January 9, 1877; application filed June 22, 1875.

*To all whom it may concern:*

Be it known that I, EDWARD KUHNS, of Logansport, in the county of Cass and State of Indiana, have invented certain new and useful Improvements in Grain-Drills; and I do hereby declare that the following is a full, clear, and exact description thereof, which will enable others skilled in the art to which it pertains to make and use the same, reference being had to the accompanying drawings, and to the letters of reference marked thereon, which form a part of this specification—

Figure 1:
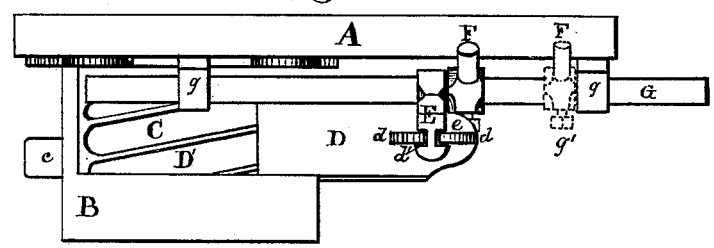
Figure 2:
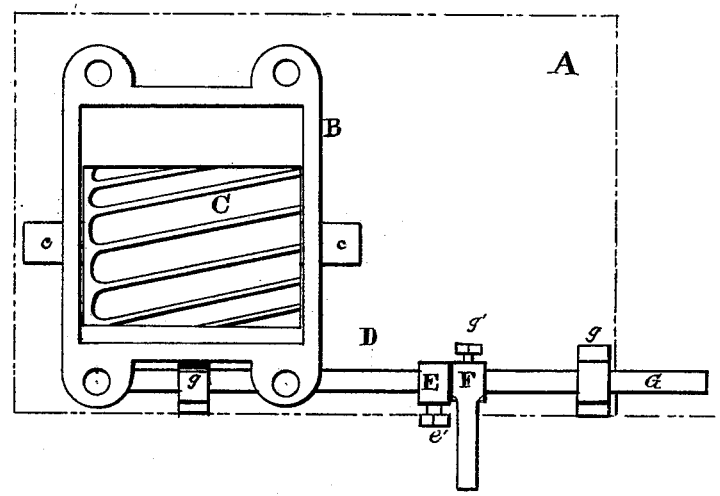
Figure 3:
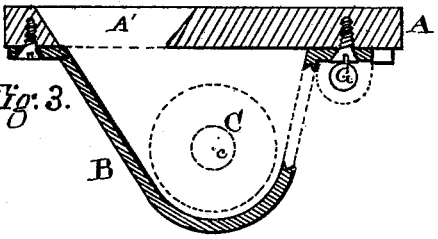

Figure 1 being a side elevation; Fig. 2, a top view with the bottom board of the hopper removed and shown only in broken lines, and Fig. 3 a sectional elevation, showing the feed-wheel and the slide-rod in position.

This invention relates to an improvement in the feeding devices of grain-drills; and it consists in the combination and arrangement of some of the parts of which it is composed.

A is the bottom board of the hopper, having an opening, A', through which the grain passes to the feed-wheel. B is the seed-cup, which is attached to the under surface of the bottom board A.

C is a feed-wheel, which is constructed with a series of spirally-formed grooves, which extend from near one of its ends to its opposite end, into which the grain falls, and by which it is carried up to, and delivered out of, an aperture in the side of the seed-cup. (Shown in Fig. 3.) This wheel is located within the seed-cup, and is secured upon a shaft, $c$, which, in a working machine, is to be extended across the whole length thereof, and upon which all of the wheels used are to be placed, each wheel being in a separate seed-cup. These wheels are placed horizontally upon the shaft, and are constructed as shown, in order that they may carry the grain to the aperture in the cup, and, at the same time, prevent it from being broken by being allowed to pass between the end of the wheel and the wall of the cup.

D is a sliding gate or regulator, which is made to slide in a line parallel with the axis of the feed-wheel, and is arranged to control, by its movements, the aperture through which the grain is delivered from the seed-cup, which function it performs by increasing or decreasing the delivery-aperture, without meeting with resistance from the grain that is in the cup at the time when it is being moved for adjustment. This slide has a projecting bracket, $d$, formed with a notch, $d'$.

E is a dog, having a neck, $e$, formed in it, which enters the notch $d'$ in the bracket. This dog is fastened, at any desired point on its rod, by a set-screw, $e'$.

F is a stop, having a handle attached, and is placed on a rod, G, at any convenient point thereof, by which the distance through which the slide D is to be moved can be regulated, so as to give the opening required in the cup for the discharge of the grain, by which means any desired amount can be sown upon a given area of ground.

G is a rod, which extends across the machine, and to which the slides of each of the cups are attached by dogs E and brackets $d$, as shown, it being fastened in boxes $g$ at convenient points, and the stop F is located near one of those boxes, so that, by placing it at the proper distance therefrom, and making it fast by the set-screw $g'$, the play of the slide D is regulated.

Having thus described my invention, what I claim, and desire to secure by Letters Patent, is—

1. In a seeding apparatus for grain-drills, the combination of a seed-cup having a portion of its case made to move horizontally over the discharge-aperture, for the purpose of regulating the amount of grain sown, and a horizontally-arranged seed-wheel, the parts being constructed and arranged as and for the purpose specified.

2. The combination of a seed-cup having a portion of its surface adjustable, the dogs for moving the adjustable parts, a rod for connecting the series of sliding parts, and a handle or stop for moving the sliding portion of the cups, substantially as and for the purpose set forth.

In testimony that I claim the foregoing as my own invention I affix my signature in presence of two witnesses.

EDWARD KUHNS.

Witnesses:
R. R. CARSON,
A. H. DAME.